H. C. DUNFEE.
COMBINED CHECK AND ORDER BLANK.
APPLICATION FILED OCT. 12, 1917.

1,284,264.

Patented Nov. 12, 1918.

Fig. 1.

The "IDEAL" Department
E. L. DUNFEE Proprietress
NURSING BOTTLES

No. 9742

Charleston, West Virginia _____ 191___

Pay to the order of _____ $1.80

One and 80-100 — — — — — — — — DOLLARS.

for advance discount as per endorsement hereon.

THE "IDEAL" DEPARTMENT.

To Kanawha Banking & Trust Co.
Charleston W. Va.

Per _____ Manager

The endorsing and using of this check constitutes an order to The "IDEAL" Department for 1 gross "IDEAL" Nursers $9.00 less $1.80 - $7.20 Terms: 2% cash.

This order to be shipped to payee promptly on return of this check to the Kanawha Banking & Trust Co. Charleston W. Va. at price and terms set out above

Fig. 2.

Inventor:
Hod C. Dunfee
By Wm E. Boulter
Attorney

UNITED STATES PATENT OFFICE.

HOD C. DUNFEE, OF CHARLESTON, WEST VIRGINIA.

COMBINED CHECK AND ORDER BLANK.

1,284,264.

Specification of Letters Patent.   Patented Nov. 12, 1918.

Application filed October 12, 1917.   Serial No. 196,175.

*To all whom it may concern:*

Be it known that I, HOD C. DUNFEE, a citizen of the United States, residing at Charleston, in the county of Kanawha and State of West Virginia, have invented certain new and useful Improvements in Combined Check and Order Blanks, of which the following is a specification.

My invention relates to a combination check and order blank for use in the transaction of commercial business.

One of the objects of my invention is to provide a combination check and order blank which when mailed to a customer (which may be a retailer or consumer) by a manufacturer constitutes a check to such customer for a certain amount of money representing a certain rebate or discount corresponding to the saving in this method of soliciting an order for goods, and when the customer indorses and deposits the check in bank for collection it becomes an order to the manufacturer for the quantity of goods specified thereon.

A further object of my invention is to provide a combination check and order blank by the use of which in commercial transactions the manufacturer and customer (retailer or consumer) are brought into closer business relations, and whereby the usual middleman and salesman are eliminated, thus effecting a great saving to the ultimate consumer.

Another object of my invention is to provide a combination check and order blank by the use of which the expense connected with the selling of goods in the usual manner is greatly reduced and the margin between the manufacturer's price and the consumer's price is made very narrow.

A further object is to provide a combination check and order blank which will demand attention when received by a retailer or consumer so that the latter will become interested and inform himself of the immense saving effected by transacting business in this way by reading the literature that accompanies the check.

A further object is to provide a combination check and order blank which renders it unnecessary for the customer to expend postage to send an order for goods or to write a letter or take extra time or trouble to fill out the order. All that is required is to indorse the check and deposit the same in bank.

A further object is to provide a combination check and order blank that will assure faithfulness on the part of the manufacturer, the latter being the loser of the rebate or discount if he fails to fill the order.

By my invention a customer will naturally give attention to the check, whereas a regular order blank might and frequently does not command attention but is thrown away.

A customer appreciates this system of selling because it gives him the saving effected by the use of the check and order blank and it does not necessitate giving any of the time heretofore required by a traveling salesman, and therefore the customer in turn will eventually lower his prices to the ultimate consumer.

No postage is required to send the order to a manufacturer as the check and order blank returns to him through the regular banking channels.

My invention consists in the combination check and order blank substantially as hereinafter more fully described, illustrated in the accompanying drawing and specifically pointed out in the appended claims.

In the drawing:

Figure 1 is a face view of my combined check and order blank showing the obverse or "check" side thereof.

Fig. 2 is a face view of the reverse or "order" side of the combined check and order blank.

In carrying out my invention I provide the device 1, which may be of paper or any other suitable fabric such as bank checks are usually prepared upon. One face, as 2, resembles in its general characteristics and appearance any ordinary bank check, that is to say it is provided as by printing or otherwise upon said face 2 with the name of the city and State wherein the drawer of the check is located, spaces for the insertion of the date and the name of the payee, the name and location of the bank on which the check is drawn, and instructions to pay a certain amount of money to the payee. A space is left at the bottom of the check for the signature of the drawer of the check.

Preferably there also appears upon the face 2 of the check a statement as to what the amount of money specified in the check is intended to represent, as for instance the words "For advance discount as per indorsement hereon."

In practice, the amount of money specified in the body of the check is intended to cover the rebate or discount which the manufacturer is willing to allow the customer for the quantity of goods specified on the reverse or "order" side of the check.

Therefore, such amount will necessarily vary according to the particular kind of goods and quantity thereof ordered by the customer, as will be clearly understood.

Other matter may appear somewhere on the face of the check if desired, as for instance the "card" of the manufacturer, i. e. his name, business and location, as shown at the upper left-hand corner of the check.

The arrangement of the various inscriptions and the wording thereof may be varied, the check shown being simply intended as an example to give a clear understanding of the idea involved in the invention.

The reverse side or face 3 of the check is provided, as by printing or otherwise, with a statement to the effect that the indorsing and using of the check constitutes an order to the drawer of the check, while below such statement appears the name of the goods, the quantity, the price and terms.

Below the above-mentioned inscription appears a statement signifying that the order is to be shipped to the payee promptly on return of the check to the bank named therein and at the price and terms set out on the reverse side of the check.

The arrangement of the various inscriptions on the "order" side of the check, and the wording may be varied, and other inscriptions may be added without departing from the principle of the invention.

The advantages of the invention will be readily apparent to any one from the foregoing description when taken in connection with the accompanying drawing.

What I claim and desire to secure by Letters Patent is:

1. A device such as described, one face of which bears a blank check form and having upon said face an inscription designating in effect that the amount of money payable by said check is an advance discount according to an indorsement on the other face of the device, and such other face bearing said indorsement, the same constituting in effect an order on the drawer of the check for a quantity of merchandise at a definite price less an amount corresponding to the aforesaid advance discount.

2. A device such as described, one face of which bears a blank check form, and the other face being provided with an inscription specifying the character of goods, the quantity, price and terms, an inscription substantially to the effect that the indorsing and using of the check constitutes an order to the drawer of the check for the quantity of goods at the price and upon the terms specified, and an inscription substantially to the effect that the order is to be shipped to the payee on return of the check to the bank named in the check at the price and terms set forth.

In testimony whereof I affix my signature in the presence of two witnesses.

HOD C. DUNFEE.

Witnesses:
H. A. GREEN,
RAY V. GLAZE.